United States Patent [19]

Salee

[11] 4,284,549

[45] Aug. 18, 1981

[54] POLYMER BLENDS WITH IMPROVED HYDROLYTIC STABILITY

[75] Inventor: Gideon Salee, Williamsville, N.Y.

[73] Assignee: Hooker Chemicals & Plastics Corp., Niagara Falls, N.Y.

[21] Appl. No.: 154,174

[22] Filed: May 28, 1980

Related U.S. Application Data

[63] Continuation of Ser. No. 905,623, May 12, 1978, abandoned, which is a continuation-in-part of Ser. No. 863,555, Dec. 22, 1977, abandoned, which is a continuation-in-part of Ser. No. 819,539, Jul. 27, 1977, abandoned.

[51] Int. Cl.$^3$ .................. C08L 67/02; C08L 81/04; C08K 7/14

[52] U.S. Cl. .................. 260/40 R; 525/437; 525/535

[58] Field of Search .............. 260/37 R, 40 R, 42.18, 260/42.44; 525/437, 535

[56] References Cited

U.S. PATENT DOCUMENTS

| | | | |
|---|---|---|---|
| 3,354,129 | 11/1967 | Edmonds et al. | 260/79 |
| 3,819,759 | 6/1974 | Weaver et al. | 260/860 |
| 4,020,124 | 4/1977 | Abolins et al. | 260/876 R |
| 4,021,596 | 5/1977 | Bailey | 428/375 |
| 4,045,382 | 8/1977 | Braese et al. | 260/876 R |
| 4,046,836 | 9/1977 | Adelmann | 260/860 |
| 4,075,262 | 2/1978 | Schaefgen | 260/860 |

FOREIGN PATENT DOCUMENTS

| | | |
|---|---|---|
| 49-34945 | 3/1974 | Japan . |
| 49-34946 | 3/1974 | Japan . |
| 51-59952 | 5/1976 | Japan . |
| 52-25852 | 2/1977 | Japan . |
| 55-18743 | 5/1980 | Japan . |

OTHER PUBLICATIONS

Ency. of Poly. Sci. & Tech., vol. 10, pp. 98, 101, 726, 735-759, 653-659.
Platzer, Editor, Polymerization Reactions and New Polymers, (ACS 1973), pp. 80-104.

*Primary Examiner*—Theodore E. Pertilla
*Attorney, Agent, or Firm*—James F. Mudd; David A. Stein

[57] ABSTRACT

This invention relates to polymer blends having improved hydrolytic stability, moldability and fire retardancy which comprise, in admixture, (1) a linear aromatic polyester prepared from an aromatic dicarboxylic acid and a bisphenol, and (2) polyphenylene sulfide.

22 Claims, No Drawings

POLYMER BLENDS WITH IMPROVED HYDROLYTIC STABILITY

CROSS-REFERENCE TO COPENDING APPLICATION

This is a continuation of application Ser. No. 905,623, filed May 12, 1978, now abandoned, which is a continuation in part of U.S. Application Ser. No. 863,555, filed Dec. 22, 1977, now abandoned, which is a continuation in part of Ser. No. 819,539 filed July 27, 1977 now abandoned.

BACKGROUND OF THE INVENTION

This invention relates to blends of polyphenylene sulfides and linear aromatic carboxylic polyesters comprising a bisphenol wherein the carboxylic acid conponent can be an aromatic dicarboxylic acid or an aliphatic saturated dicarboxylic acid such as oxalic or adipic acids.

Linear aromatic polyesters prepared from aromatic dicarboxylic acids and bisphenols are well known for their suitability of molding, extrusion, casting, and film-forming applications. For example, U.S. Pat. No. 3,216,970 to Conix, disclose linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

Aromatic polyesters which are particularly well suited for molding applications may also be prepared by reacting an organic diacid halide with a difunctional aliphatic reactive modifier, such as a glycol, and subsequently reacting this product with a bisphenol compound. The resulting polyesters have reduced melt viscosities and melting points which permits molding at temperatures within the operable limits of conventional molding appartus (i.e. less than about 300° C.). This type of glycol-modified polyester is more fully disclosed in U.S. Pat. No. 3,471,441, to Hindersinn.

In order to form a successful molding resin on a commercial scale, a polymer should be capable of being molded conveniently without significant degradation in physical properties. In this respect, although the aforementioned aromatic polyesters generally display excellent physical and chemical properties, a persistent and troublesome problem has been their sensitivity to hydrolytic degradation at elevated temperatures. This sensitivity to the combined effects of heat and moisture is also exhibited in commercially available polycarbonate resins as evidenced by the desirability of reducing the water content of the resin to less than about 0.05% prior to molding. Unfortunately, however, the aromatic polyester resins often display a more pronounced tendency to rapidly degrade and embrittle than do polycarbonate resins. This is demonstrated by the loss of tensile strength which can occur when an aromatic polyester resin is molded and subsequently immersed in boiling water. This tendency may be explained, in part, by the hydrolysis of the ester linkages under these conditions.

In any event, it is to be appreciated that sensitivity to moisture represents a significant problem in aromatic polyester resins that would significantly limit their commercial utility in applications such as in autoclaves or at elevated temperatures in humid atmospheres.

Accordingly, it is a principal object of this invention to prepare aromatic polyester compositions having superior physical and chemical properties as well as improved hydrolytic stability.

SUMMARY OF THE INVENTION

It has now been found that polyester molding compositions having improved hydrolytic stability may be prepared by blending a linear aromatic polyester with polyphenylene sulfide. The preferred aromatic polyesters of this invention, are prepared from bisphenols and at least one aromatic dicarboxylic acid, most preferably selected from the group consisting of isophthalic acid, terephthalic acid, or mixtures thereof.

DESCRIPTION OF THE PREFERRED EMBODIMENTS

The linear aromatic polyesters of the present invention can be prepared by condensing a diacid halide of a dicarboxylic acid, dissolved in an organic liquid which is a solvent for the polyester to be formed, with a metal phenolate of a bisphenol, dissolved in a liquid which is immiscible with the solvent for the diacid halide. This process is more fully described in U.S. Pat. No. 3,216,970, to Conix, the disclosure of which is incorporated herein by reference.

The bisphenols which can be used in this process are known in the art and correspond to the general formula:

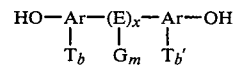

wherein Ar is aromatic, preferably containing 6–18 carbon atoms (including phenyl, biphenyl and napthyl); G is alkyl, haloalkyl, aryl, haloaryl, alkylaryl, haloalkylaryl, arylalkyl, haloarylalkyl, cycloalkyl, or halocycloalkyl; E is a divalent (or di-substituted) alkylene, haloalkylene, cycloalkylene, halocycloalkylene, arylene, or haloarylene, —O—, —S—, —SO—, —SO$_2$—, —SO$_3$—, —CO—,

or GN<; T and T' are independently selected from the group consisting of halogen, such as chlorine or bromine, G and OG; m is an integer from 0 to the number of replaceable hydrogen atoms on E; b is an integer from 0 to the number of replaceable hydrogen atoms on Ar, and x is 0 or 1. When there is plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows:

alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bis(4-hydroxyphenyl)methane, bis(2-hydroxyphenyl)methane; (4-hydroxyphenyl-, 2-hydroxyphenyl)-methane, and mixtures thereof; bis(4-hydroxy-3,5-dichlorophenyl)methane, bis(4-hydroxy-3,5-dibromophenyl)methane, bis(4-hydroxy-3,5-difluorophenyl)methane, bisphenol-A [bis(4-hydroxyphenyl)-2,2-propane] bis-(4-hydroxy-3,5-dichlorophenyl)-2,2-propane. bis(3-chloro-4-hydroxyphenyl)-2,2-propane, bis(4-hydroxynaphthyl)-2,2-propane, bis(4-hydroxynaphthyl)-2,2-propane, bis(4-hydroxyphenyl)-phenyl methane, bis(4-hydroxyphenyl) diphenyl methane, bis(4-hydroxyphenyl)-4'-methyl phenyl methane, bis(4-hydroxyphenyl)-4'-chlorophenyl methane, bis(4-hydroxyphenyl)-2,2,2-trichloro-1,1,2-ethane, bis(4-hydroxyphenyl)-1,1-cyclohexane, bis(4-hydroxyphenyl)cyclohexyl methane, 4,4-dihydroxyphenyl, 2,2'-dihydroxydiphenyl, dihydroxynaphthalenes, bis(4-hydroxyphenyl)-2,2-butane, bis(2,6-dichloro-4-hydroxyphenyl)-2,2-propane, bis(2-methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-tertiary butylphenyl)-2,2-propane, bis(4-hydroxyphenyl)-1-phenyl-1,1-ethane, 4,4'-dihydroxy-3-methyl diphenyl-2,2-propane, 4,4'-dihydroxy-3-methyl-3'-isopropyl diphenyl-2,2-butane, bis(4-hydroxyphenyl)sulfide, bis(4-hydroxyphenyl)ketone, bis(4-hydroxyphenyl)oxide, bis(4-hydroxyphenyl)sulfone, bis(4-hydroxyphenyl)sulfoxide, bis(4-hydroxyphenyl)sulfonate, bis(4-hydroxyphenyl)amine, bis(4-hydroxyphenyl)phenyl phosphine oxide. 2,2-bis(3-chloro-4-hydroxyphenyl)propane, 4,4'-cyclomethylene) bis-(2,6-dichlorophenol; 2,2-bis-(3,5-dichloro-4-hydroxyphenyl)-propane, 2,2-bis-3,5-dibromo-4-hydroxyphenyl)-propane, 1,1-bis-(3,5-dichloro-4-hydroxyphenyl)-1-phenylethane, 2,2-bis-(3,5-dibromo-4-hydroxyphenyl-hexane, 4,4'-dihydroxy-3,3',5,5'-tetrachlorodiphenyl, 2,2-bis-(3-chloro-4-hydroxyphenyl)-propane, 2,2-bis-(3,5-dibromo-4-hydroxyphenyl)-propane, 2,2-bis-(3,5-dichloro-4-hydroxyphenyl)-propane, tetra-chlorodiphenylolsulfone, bis(3,5-dibromo-4-hydroxy phenyl)-phenyl phosphine oxide, bis(3,5-dibromo-4-hydroxyphenyl) sulfoxide, bis(3,5-dibromo-4-hydroxyphenyl)sulfone, bis(3,5-dibromo-4-hydroxyphenyl)-sulfonate, bis(3,5-dibromo-4-hydroxyphenyl)-sulfide, bis(3,5-dibromo-4-hydroxyphenyl)-amine, bis(3,5-dibromo-4-hydroxyphenyl)-ketone, and 2,3,5,6,2',3',5',6,-octochloro-4-4'-hydroxy biphenyl. Representative biphenols are o,o'-biphenol, m,m'-biphenol; p,p'-biphenol; bicresols, such as 4,4'-bi-o-cresol, 6,6'-bi-o-cresol, 4,4'-bi-m-cresol; dibenzyl biphenols such as a,a'-diphenol-4,4'-bi-o-cresol; diethyl bisphenols such as 2,2'-diethyl-p,p'-biphenol, and 5,5'-diethyl-o,o'-biphenol; dipropyl biphenols such as 5,5'-dipropyl-o,o'-biphenol and 2,2'-diisopropyl-p,p'-biphenol; dially biphenols such as 2,2'-diallyl-p,p'-biphenol; and dihalobiphenols, such as 4,4'-dibromo-o,o'-biphenol. Mixtures of isomers of the foregoing bisphenols can be used.

The dicarboxylic acids which are useful in this process are also well known and can be represented by the formula:

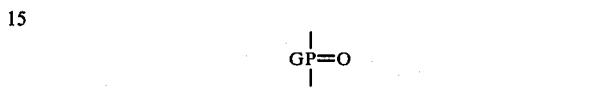

in which X is oxygen or sulfur, Z is alkylene, —Ar— or —AR—Y—Ar— where Ar has the same definition as given with respect to the bisphenols, Y is a alkylene, of 1 to 10 carbons, haloalkylene, —O—, —S—, —SO—, —SO$_2$—, —SO$_3$—, —CO—,

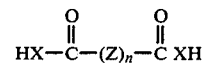

or GN<; and n is 0 or 1.

Suitable dicarboxylic acids include aromatic dicarboxylic acids such as phthalic acid, isohthalic acid, terephthalic acid, bis(4-carboxy)-diphenyl, bis(4-carboxyphenyl)-ether, bis(4-carboxyphenyl)-sulfone, bis(4-carboxyphenyl)-carbonyl, bis(4-carboxyphenyl)-methane, bis(4-carboxyphenyl)-dichloromethane, 1,2- and 1,1-bis(4-carboxyphenyl)-ethane, 1,2- and 2,2-bis(4-carboxyphenyl)-propane, 1,2- and 2,2-bis(3-carboxyphenyl)-propane, 2,2-bis(4-carboxyphenyl)-1, 1-dimethyl propane, 1,1- and 2,2-bis(4-carboxyphenyl)-butane, 1,1- and 2,2-bis(4-carboxyphenyl)-pentane, 3,3-bis(4-carboxyphenyl)-heptane, 2,2-bis(4-carboxyphenyl)-heptane, and aliphatic acids such as oxalic acid, adipic acid, succinic acid, malonic acid, sebacic acid, glutaric acid, azelaic acid, suberic acid and the like. Isophthalic acid and terephthalic acid are preferred due to their availability and low cost. Most preferably, the dicarboxylic acid component comprises a mixture of about 75 to about 100 mol percent isophthalic acid and about 25 to about 0 mole percent terephthalic acid.

When the dicarboxylic acids used in preparing a polyester of the invention consist of both isophthalic and terephthalic acids in accordance with an especially preferred embodiment of the invention, a weight proportion of isophthalic to terephthalic acid residues in the polyester ranging from about 75:25 to about 90:10 provides an especially satisfactory result.

An alternate process for preparing suitable aromatic polyesters, disclosed in U.S. Pat. No. 3,471,441, to Hindersinn et al., the disclosure of which is incorporated herein by reference, comprises the homogeneous reaction of an aliphatic modifier, preferably a glycol of 2 to about 100 carbon atoms, with a diacid halide or a dicarboxylic acid, followed by an interfacial polymerization of the resultant prepolymer with a bisphenol. Compositions prepared by this process have an aliphatic modifier, i.e. a glycol, incorporated into the structure of the reaction product of the bisphenol and diacid halide, and possess excellent engineering properties such as high impact strength, high modulus, improved moldability, and high softening points.

The bisphenol and dicarboxylic acid components which may be employed in the Hindersinn et al. preparatory process correspond to those described above. The aliphatic modifier is a reactive difunctional component which may be represented by the formula:

wherein D and D' are independently selected from the group consisting of O, S, and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl, alkylene-carboxyalkylene-carboxyalkyl, and poly(alkylene carboxyalkylene-carboxy)alkyl; and n is an integer from 1 to 2 with n being 2 when D and D' is N. Typical examples of aliphatic modifiers having the foregoing formula include ethylene glycol, diethylene glycol, neopentyl glycol, 1,4-cyclohexane, dimethanol, 1,4-butane dithiol, dipropylene glycol, polypropylene glycol, 1,1-isopropylidene bis(p-phenyleneoxy)di-2-ethanol, 2,2,4,4-tetramethyl-1,3-cyclobutanediol, bis(4-hydroxycyclohexane)-2,2-propane, di(hydroxyethyl) adipate, di(hydroxypropyl) glutarate, di(hydroxyethyl) poly(ethylene glycol)adipate, ethane dithiol, ethanolamine, methylethanolamine, hexamethylenediamine, 1,3-propanediol, 2-mercaptoethanol, and 2-aminopropanethiol. Combinations of the above-described aliphatic modifiers can also be employed, usually to obtain special properties.

Soolution processes can also be employed in the preparation of suitable aromatic polyesters, such as disclosed in U.S. Pat. Nos. 4,051,107 and 4,051,106, the disclosures of which are incorporated herein by reference.

The polyester components of the invention are preferably prepared by a process, described as melt polymerization, involving an ester interchange, i.e. transesterfication reaction, between a diphenolic reactant and a diaryl ester of a dicarboxylic acid carried out in the melt (i.e. without use of a reaction solvent or diluent). Such a process is described in British Pat. No. 924,607, to Imperial Chemical Industries Limited, the disclosure of which is incorporated herein by reference.

A further melt polymerization process which can be used to prepare linear aromatic polyesters suitable for use in this invention is described and claimed in copending application Ser. No. 818,493, filed July 25, 1977, as a continuation-in-part of application Ser. No. 542,635, filed Jan. 20, 1975, now abandoned. This process basically comprises first mixing a bisphenol, a diaryl ester of a dicarboxylic acid and a diol, and then reacting the resulting mixture in the presence of a transesterification catalyst. The disclosure of this application is incorporated herein by reference.

The polyphenylene sulfide component of the instant invention is a crystalline polymer with a repeating structural unit comprising a para-substituted benzene ring and a sulfur atom which may be described by the formula, where n has a value of at least about 100.

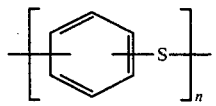

The preparation of polyphenylene sulfide is illustrated in U.S. Pat. No. 3,354,129, to Edmonds, Jr. et al., the disclosure of which is incorporated herein by reference, wherein at least one polyhalosubstituted cyclic compound is reacted with an alkali metal sulfide in a polar organic solvent reaction medium. Suitable polyphenylene sulfide compositions are available commercially under the tradename RYTON of the Phillips Petroleum Company, and include compositions which are either unfilled, or filled with glass or some such conventional material. Preferably, the polyphenylene sulfide component has a melt flow index, measured at 600° F. using a 5 Kg. weight and a standard orifice, within the range of from about 40 to about 7000.

The novel resin compositions of the instant invention are prepared by blending the linear aromatic polyester with polyphenylene sulfide. The blending or mixing process can be performed using conventional mixing equipment such as, for example, a Banbury mixer, mixing roll, kneader, screw extruder, or injection molding machine. Although the mixing ratio may vary depending on the physical properties desired in the resultant polymer blend, the polyphenylene sulfide component is present preferably in an amount of about 5 parts to about 95 parts by weight of blended polymer, and most preferably, about 5 parts to about 30 parts by weight of polyblend.

The novel polymer compositions of the present invention may also include various additives such as organic or inorganic fillers, stabilizers, antistatic agents, and flame retardants.

The halogen-containing flame retardant agents of U.S. application Ser. No. 863,556, filed Dec. 22, 1977 and of copending U.S. application Ser. No. 863,381, also filed Dec. 22, 1977, can be employed in the present compositions. The disclosures of these applications are incorporated herein by reference.

The additive-containing resin mixture of the invention may be prepared, if desired, by charging the polyester and sulfide polymer with the additive to a conventional mixing apparatus, such as a premix mixer, or melt extruder. The resultant additive-containing composition can then be molded directly in the injection molding apparatus or an extruder. The molded articles thus formed have excellent hydrolytic stability and tensile strength.

The fillers which may be employed in the invention are preferably particulate fillers such as particulate glass (e.g. chopped glass fiber, glass rovings, glass microballoons or microspheres and pulverulent glass) particulate clay, talc, mica, inorganic natural fibers, synthetic organic fibers, alumina, graphite, silica, calcium carbonate, carbon black, magnesia and the like. Generally such fillers are added to reinforce the structural integrity of a polymer, e.g. to inhibit sagging and/or to improve the tensile strength and stiffness of the polymer composition and also to reduce shrinkage, minimize crazing, lower material costs, impart color or opacity, and improve the surface finish of the polymer composition. Generally the amount of particulate filler employed in the compositions of the invention is in the range of about 5 to about 70 weight percent, preferably about 5 to about 40 weight percent and especially about 8 to about 30 weight percent based on the combined weight of the polyester and the phenylene sulfide polymer. The filler employed is preferably inorganic.

It is found according to the invention that use as filler of particulate glass, advantageously glass fibers, is especially desirable since the presence of the particulate glass filler further enhances the fire retardancy of polymer mixture of the invention.

The presence of the particulate glass component in the compositions of the invention generally enhances the flame retardance of the polyester-sulfide polymer blend to the extent that excellent fire retardant performance is achieved even when the compositions are molded in extremely thin sections, (e.g. of thicknesses less than about 1/16 of an inch). This excellent flame retardance performance makes the glass filled compositions of the invention especially suitable for the fabrication of electrical components such as miniture circuit boards and the like.

The glass filling, especially glass fiber filling, employed in the invention preferably contains an organic coupling agent as a very thin coating on the glass particles. The coupling agent forms an adhesive bridge between the glass and the polymer blend thereby enhancing the strength properties of the filled polymer blend. Typically, organic coupling agents employed in the art include transition metal complexes of unsaturated aliphatic acids such as the methacrylato chromic chloride complex as well as various organic silane compounds including vinyl trichlorosilane, vinyl triethoxysilane, gamma amino-propyl triethoxysilane, ally trichlorosilane resorcinol, vinyltrimethoxysilane, amyltrimethoxysilane, phenyltriethoxysilane, β-cyclohexylethyltrimethoxysilane, γ-methacryloxypropyltrimethoxysilane, γ-iodopropyltrimethoxysilane, γ-chloropropyltrimethoxysilane, γ-chloroisobutyltriethoxysilane, γ-glycidoxypropyltriemthoxysilane, N-β-aminoethyl-γ-aminopropyltrimethoxysilane, N-bis-(β-hydroxyethyl)-γ-aminopropyltriethoxysilane, and β-(3,4-epoxycyclohexylethyltrimethoxysilane.

Preferably the coupling agent employed with the glass filler according to the invention is a silane coupling agent.

Glass fillers are frequently manufactured and sold so as to contain the coupling agent as a proprietary ingredient on the surface of the glass. The coupling agents and their use with glass fillers are discussed in more detail in W. V. Titow and B. J. Lanham, "Reinforced Thermoplastics", Halstead Press, 1975, p. 83–88 and L. Mascia, "The Role of Additives in Plastics", J. Wiley and Sons, 1974, p. 89–91, the disclosures of which references are incorporated herein by reference.

It has also been found according to the invention that the presence of antimony additives (such as metallic antimony and compounds of antimony) is generally undesirable since the presence of the antimony constituent generally is detrimental to the flame retardance of the polymer mixture as is illustrated in the examples below.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1

Preparation of Linear Aromatic Polyester (A) By Solution Polymerization

A mixture of 165.7 parts isophthaloyl chloride, 29.2 parts terephthaloyl chloride, and 223.5 parts bisphenol-A (2,2-bis(4-hydroxyphenyl)propane) were dissolved in 2270 parts methylene chloride (having a moisture content of 10 ppm of water) in a reactor at 25° C. 200.7 parts triethyl amine were added at a constant rate to the reaction mixture over a period of 7.5 hours, under a nitrogen purge with stirring. The reaction mixture was maintained at 15° C. After completion of the triethylamine addition, the mixture was stirred for two hours at 20° C. 6.8 parts of benzoyl chloride were then added to react with the end-groups of the polymer. After one hour, 13.7 parts isopropanol were added to react with any excess benzoyl chloride. After ½ hour, dilute aqueous hydrogen chloride (570 parts of a 0.5 wt.% sol.) was added to react with any excess triethylamine for an additional ½ hour with stirring. The two phases were then allowed to separate by gravity, and the water phase was removed. Additional washes of the polymer solution with equal amounts of water were carried out until the chloride ion in the polymer solution measured less than 0.1 ppm. The polymer was then precipitated from solution and dried in a vacuum oven until the moisture concentration was less than 0.1 wt.%. The resultant high molecular weight polymer had an intrinsic viscosity of 0.74 dl/g in sym. tetrachloroethane (at 30° C.)

(B) By Melt (transesterification) Polymerization

Bisphenol-A (1319.1 g), diphenyl terephthalate (275.9 g) and diphenyl isophthalate (1562.9) were dried for several hours at 75° in a vacuum oven and charged with 0.07 g. of anhydrous lithium hydroxide transesterification catalyst to a 5-liter resin kettle under nitrogen. The kettle was equipped with a thermometer, a nitrogen inlet on a Y-tube, a mechanical stirrer, a short Vigreaux column, a distillation head and 3 necked flask receiver.

The kettle was heated to 210° to melt the reactants and vacuum was applied gradually to the stirred molten mass. The temperature of the reaction mass was increased gradually to remove phenol overhead to the receiver. After 1.4 hours the temperature of the reaction mass reached 228° and the reaction mass pressure was about 0.5 mm Hg. The reaction mass was then flooded with dry nitrogen to relieve the vacuum and the viscous reaction mass was poured into a foil-lined glass tray and allowed to cool to ambient temperature.

The bisphenol A-isophthalate-terephthalate prepolymer thus obtained was broken up and dried overnight at 70° in a vacuum oven. The dried prepolymer (1070 g.) was changed to a two gallon oil-heated stainless steel reactor equipped with agitation means under dry nitrogen and heated with agitation to 210°. Agitation of the molten mass was commenced after 1 hours. After 1.3 hours from the commencement of heating, vacuum (about 0.6 mm of Hg.) was applied to the agitated mass. The reaction temperature was raised gradually over a period of about 2 hours to 305°. The agitated reaction mass was then maintained under vacuum at 305° for 6.7 hours. The reactor was opened and the polyester obtained was discharged from the reactor and allowed to cool to ambient temperature. A clear yellow bisphenol A-isophthalate-terephthalate polyester having a relative viscosity of 1.36 (measured in tetrachloroethane at 30°) was obtained.

The foregoing procedure was repeated with 1100 g. of prepolymer being employed in the polymerization reaction. A similar polymer was obtained having a relative viscosity of 1.35 (measured in tetrachloroethane at 30°).

EXAMPLE 2

Preparation of Molding Composition

A linear aromatic polyester was prepared according to the procedure of Example 1 (A) and dried for four hours at 120° C. 100 parts of polyphenylene sulfide (commercially sold under the trade name RYTON V-1 by the Phillips Petroleum Company), having a melt flow index of 6,000 as determined at 600° F. with a 5 Kg. weight using a standard orifice, was added to 900 parts of polyester and tumble mixed for 0.5 to 1 hour. The blend was milled on a two roll Farrell Mill (front roll heated to 480° F., back roll heated to 425° C.) for 1.5-3.0 minutes at 45 r.p.m. The blend was then sheeted, and ground to 4 m.m granule size on a granulator. The granules were dried for 1-2 hours at 120° C. and injection molded to produce tensile and flex bars. The injection molding conditions were as follows:

| MOLDING PARAMETERS | |
| --- | --- |
| Barrel Temperature (°F.) | 600 |
| Nozzle Temperature (°F.) | 580 |
| Mold Temperature (°F.) | 250 |
| Screw Speed (rpm) | 120 |
| Back Pressure (psi) | 625 |
| Injection Pressure (psi) | 11,200 |
| Plasticating Time (secs) | 8 |
| Fill Time (secs) | 3 |
| Total Injection Time (secs) | 10 |

The tensile bars thus prepared were tested and found to have the following physical properties. By way of comparison, a control, which does not include polyphenylene sulfide, is also shown.

| PROPERTIES | Example 2 | Control |
| --- | --- | --- |
| Tensile Strength (psi) | 10,150 | 10,000 |
| Tensile Modulus (psi × 10$^5$) | 3.09 | 3.34 |
| After 7 days immersion in boiling H$_2$O: | | |
| Tensile Strength (psi) | 10,800 | 1,700 |
| Tensile Modulus (psi × 10$^5$) | 3.34 | 2.75 |

EXAMPLES 3-6

Preparation of Molding Compositions

A linear aromatic polyester was prepared according to the procedure of Example 1 (A) and dried for four hours at 120° C. The procedure of Example 2 was followed to produce 4 mm. granules.

The granules were dried for 4 hours at 120° C. and were then blended with polyphenylene sulfide pellets (commercially sold by the Phillips Petroleum Corp. under the tradename RYTON 6), having a melt flow index of 50 as determined at 600° F. with a 5 Kg. weight using a standard orifice in various mixing ratios. Tensile bars were prepared and tested, and the results are summarized in Table 1 below.

The aromatic polyesters of the invention generally have an intrinsic viscosity of at least 0.5 dl/g when measured in sym. tetrachloroethane at 30° C., and preferably at least 0.6 dl/g.

TABLE 1

| | EXAMPLE 3 | EXAMPLE 4 | EXAMPLE 5 | EXAMPLE 6 |
| --- | --- | --- | --- | --- |
| COMPOSITION | | | | |
| Polyester (parts) | 475 | 450 | 425 | 400 |
| Polyphenylene Sulfide (parts) | 25 (5%) | 50 (10%) | 75 (15%) | 100 (20%) |
| PROPERTIES | | | | |
| Tensile Strength (psi) | 10,200 | 10,200 | 10,400 | 10,500 |
| Tensile Modulus (psi × 10$^5$) | 3.07 | 3.26 | 3.26 | 3.61 |
| After 7 days immersion in boiling water: | | | | |
| Tensile Strength (psi) | 4,700 | 7,800 | 8,000 | 9,800 |
| Tensile Modulus (psi × 10$^5$) | 3.43 | 3.48 | 3.43 | 3.68 |
| MOLDING COMPOSITIONS | | | | |
| Barrel Temperature (°F.) | 600 | 600 | 600 | 600 |
| Mold Temperature (°F.) | 250 | 250 | 250 | 250 |
| Injection Pressure (psi) | 23,300 | 18,900 | 16,600 | 14,400 |
| Screw Speed (rpm) | 230 | 230 | 230 | 240 |
| Plasticating Time (secs) | 9 | 8 | 8 | 7 |
| Fill Time (sec) | 4 | 6 | 4 | 5 |
| Total Injection Cycle (sec) | 40 | 40 | 40 | 40 |

These Examples demonstrate the significant improvements in hydrolytic stability achieved by blending polyphenylene sulfide with linear aromatic polyester compositions.

EXAMPLE 7

About 450 parts of a bisphenol A-isophthalate polyester resin having an isophthalate:terephthalate ratio of 5.67 which was prepared substantially as described in Example 1 (A) was dried for about 4 hours at 120° and charged gradually to the Farrell Mill described in Example 2 which was operated with its front roll at 450° F. and its back roll at 410° F. until fusion of the resin was completed and a band of clear resin formed on the front roll. About 50 parts of the polyphenylene sulfide resin of Example 2 was then added until a homogeneous resin band formed on the front roll.

The mixture of resins was milled for about 1.5 to 3 minutes and then sheeted from the mill. The milled resin blend was ground to granules of about 4 m.m. granule size as described in Example 2 which were then dried at about 120° for about 4 hours.

The dried resin mixture granules were mixed with 58.3 parts of chopped glass fiber (3/16 inch length, manufactured by Owens Corning Fiberglass Corporation under the designation 419AA, which contains a proprietary silane coupling agent). The resultant mixture was then added to an Arburg Alrounder 200 injection molding machine operated at a barrel temperature of 600° F., a mold temperature of 215°-225° F. and an injection pressure of about 14,000 psi.

The mixture was molded as bar specimens which were subsequently reground and dried substantially as described hereinabove to ensure that a homogeneous blend was obtained. The dried reground glass fiber-resin mixture was then charged to an Arburg 221E/150 Injection molding machine operated at a barrel temperature of 550° F., a mold temperature of about 290°-295° F., and an injection pressure of about 16,760 psi to injection mold the resin-glass fiber blend into specimen bars of about 5 inch length, ½ inch width and 1/16 inch thickness. Several of the 1/16 inch thickness specimen bars were reserved for the flame retardant test described herein below.

The remainder of the 1/16 inch thick specimen bars were dried at 120° for about 2 hours and compression molded between steel plate backed aluminum sheets in a Carver Four Paten Laboratory Press operated at 400°-430° F. and a pressure of about 30,000 to 35,000 psi to obtain specimen bars 5 inches in length, ½ inch in width and 1/32 inch in thickness.

The 1/16 inch- and 1/32 inch-thick bar specimens are evaluated in flame retardant properties according to the Vertical Burning Test described in "UL-94-Standards For Safety", Underwriters Laboratory Inc., Second Revised Edition, May 2, 1975, pages 6–8. In accordance with the evaluation technique of the aforementioned test the specimens are rated V-0, V-1 or V-2, with V-0 indicating the greatest degree of flame retardancy and V-2 indicating the poorest degree of flame retardancy. The Oxygen Index of a sample of the injected resin product obtained from the latter Arburg molding apparatus was also determined.

The results of the aforementioned flame retardant tests upon the excellent glass fiber-filled resin blend obtained in this Example are reported in Table 2 below.

EXAMPLE 8

To provide a basis for comparing the flame retardancy of the aforementioned glass fiber-filled resin blend with that of an unfilled resin blend of the invention, an unfilled resin blend of the invention containing the polyester of Example 1-A was milled and injected molded substantially as described hereinabove at Examples 2 and 7 to provide the 1/16 inch- and 1/32 inch-bar specimens described in Example 7. As a glass-fiber component was not employed, it was unnecessary to regrind and remold the product as described in Example 7 to provide a homogeneous blend of the product components.

The specimen bars were evaluated for flame retardance according to the UL-94 Vertical Burning Test and their Oxygen Index was determined as described in Example 7. The resultant test data is compared with that of the Example 7 product in Table 2.

EXAMPLE 9

The procedure of Example 7 was repeated substantially as described except that the bisphenol A-isophthalate-terephthalate polyester employed was prepared by melt polymerization as described in Example 1 (B) and the flame retardance of a 1/16 inch thickness specimen and the Oxygen Index of the product were not measured. The results of this example are also presented in the Table below.

EXAMPLE 10

The procedure of Example 8 was repeated substantially as described with the same proportions of polyester and polyphenylene sulfide as in Example 8 except that the bisphenol A-isophthalateterephthalate polyester employed was prepared by melt polymerization as described in Example 1 (B) and the flame retardance of a 1/16 inch thickness specimen and the product Oxygen Index were not determined. The results of ths Example are also presented in the Table below.

EXAMPLES 11-13 (Controls)

Examples 11–13, which employ the polyester of Example 1(A) and which are summarized in Table 2 below, are Control Examples substantially comparable to Examples 7 and 8. The products of Examples 11–13 are compositions substantially comparable to those described in Examples 7 and 8 except that one or more of the components of the Examples 7 and 8 products were omitted. Control Examples 11–12 illustrate the effect on flame retardance resulting from addition of an antimony compound ($Sb_2O_3$) to the resin compositions of the invention.

Where a glass fiber filler constituent is employed in these Control Examples, the mixtures were milled, molded and tested for flame retardancy substantially in accordance with the procedure of Example 7. Where glass fiber filler is not employed, the Control Example was carried out by the procedure of Example 8 substantially as described. The antimony additive employed in Examples 11-12 was added to the resin mixture during the milling of the latter in the Farrell Mill (substantially in accord with the method of addition of the polyphenylene sulfide constituent described in Example 7 and subsequent to the addition of the latter polymer).

TABLE 2

| CONSTITUENTS | EXAMPLE: (Control Examples in Parenthesis) | | | | | | |
|---|---|---|---|---|---|---|---|
| (in parts) | 7 | 8 | 9 | 10 | (11) | (12) | (13) |
| Bisphenol A-Isophthalate-Terephthalate Polyester | 450 | 1500 | 450**** | 450**** | 1000 | 450 | 450 |
| Polyphenylene Sulfide*** | 50 | 167 | 50 | 50 | — | 50 | 50 |
| Glass Fiber | 58.3 | — | 58.3 | — | — | — | 58.3 |
| Antimony Trioxide | — | — | — | — | — | 5 | 5 |
| Vertical Burning Test Evaluation (UL-94) | | | | | | | |
| 1/16 inch thickness specimen | V-0 | V-0 | * | * | * | V-2 | V-2 |
| 1/32 inch thickness specimen | V-0 | V-2 | V-1 | V-2 | V-1 | V-2 | V-2 |
| Oxygen Index | 38.5 | 35.0 | * | * | 37.2** | 35.1 | 35.9 |

NOTES:
*Not determined
**The average of eight determinations ranging from 34.8 to 40.1
***Pure polyphenylene sulfiide, because of its extreme brittleness, could not be made into 1/16 inch or thinner molded specimens and hence could not be tested for flame retardance.
****Polyester prepared by melt (transesterification) polymerization as described in Exampe 1(B). The polyester of the other examples is prepared by solution polymerization as described in Example 1(A).

In Example 8 of Table 2 the proportion of polyester and polyphenylene sulfide is 9:1 corresponding to the proportions of these constituents in Examples 7, 10, 12 and 13.

As is evident from the data of Table 2 by comparison of the results of Example 7 with those of Example 8, the use of a particulate glass filler in the present resin blend enhances significantly the flame retardant property of the resin blend according to both the UL-94-test evaluation described above and Oxygen Index. p The results of Examples 9 and 10 indicate that a similar effect from use of filler is obtained when the polyester is prepared by melt polymerization.

By comparison of the test results of the product of Example 8 with those of the product of Example 11, the unfilled product of the invention as prepared in Example 8 has a flame retardance superior to that of its polyester component.

Comparison of the test results of Examples 7 and 8 with those of Examples 12 and 13 indicate that the presence of an antimony constituent in the resin blends of the invention (both filled and unfilled) is deleterious to the flame retardance of the blends.

It will be appreciated by those skilled in the art that procedural modifications of the above-described experimental technique can be made without departing from the spirit and scope of the invention.

For example, in Example 7 a similar result providing a homogeneous glass filler-resin mixture can be obtained without the necessity of regrinding the molded glass fiber-containing resin product. In this alternative procedure the Farrell Mill resin product, after being ground to granules and dried, is added to the hopper end of a screw resin extruder (such as a Haake Polytest 45 single screw extruder or a Werner Pfleider ZDS-K28 twin screw extruder) while the particulate glass component is added downstream on the extruder. (Alternatively, the particulate glass can be mixed with the dried ground granules with the resultant mixture being added to the hopper end of the extruder). The resultant extruded resin containing a homogeneous dispersion of the glass component is then sliced into pellets which are then injection molded as described in Examples 2 and 8.

Also, instead of separate addition of the particulate glass constituent as described in Example 7, the latter constituent can be homogeneously blended with the sulfide polymer constituent of the resin blend before the said sulfide polymer is added to the polyester.

In place of the chopped glass fiber employed in the above Examples, other forms of particulate glass filler agents such as uncut glass strands, glass rovings, glass pellets, pulverulent glass, and glass micro-balloons can be used.

The invention has been described in the above specification and illustrated by reference to specific embodiments in the illustrative examples. However, it is to be understood that these embodiments are not intended to limit the invention since, as illustrated, changes and modifications in the specific details disclosed hereinabove can be made without departing from the scope or spirit of the invention.

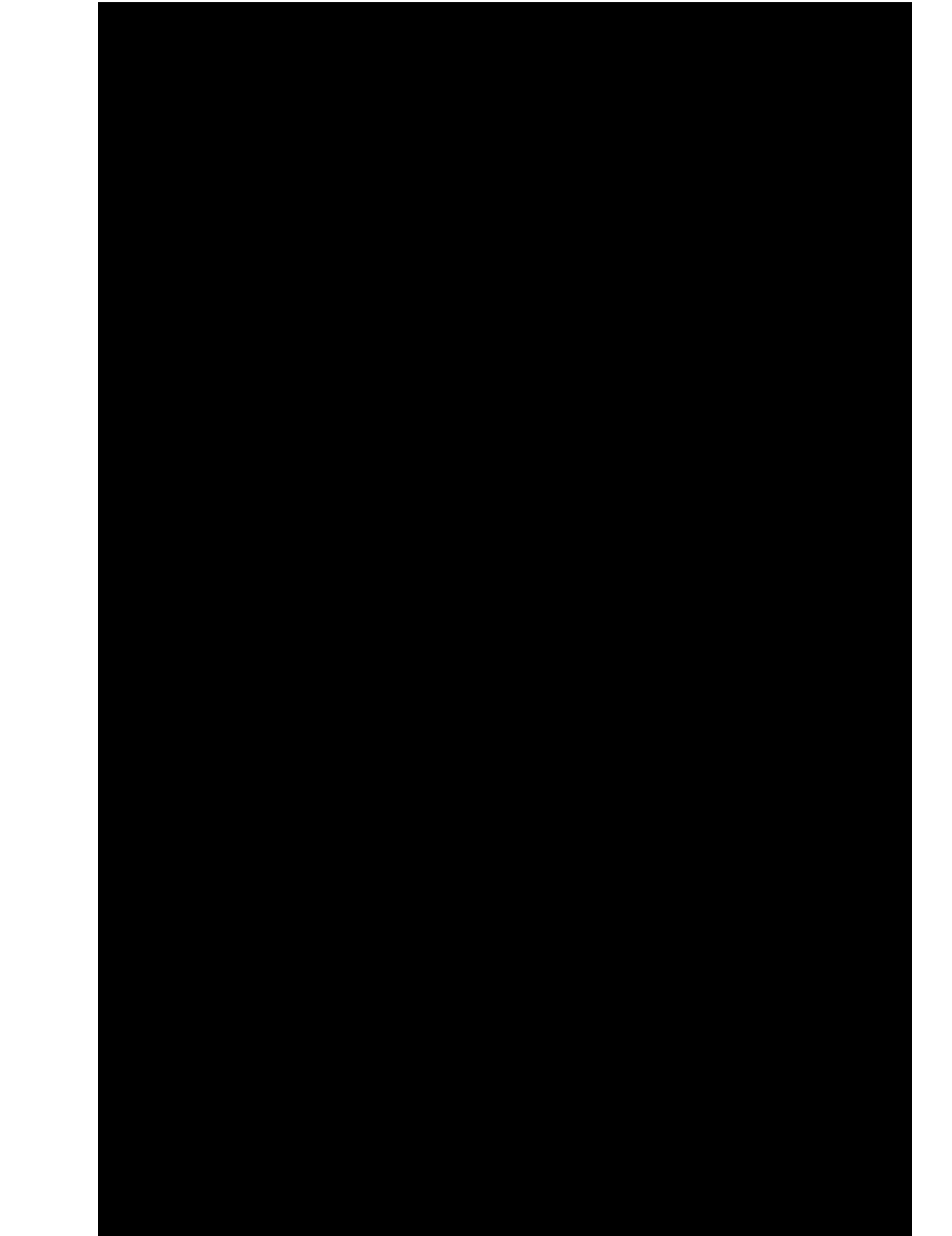

We claim:

1. A thermoplastic polymeric composition having improved hydrolytic stability comprising, in admixture, (a) a linear aromatic polyester of components comprising a bisphenol and a dicarboxylic acid, and (b) polyphenylene sulfide.

2. The composition of claim 1 wherein said dicarboxylic acid has the formula:

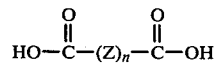

wherein Z is alkylene, —Ar— or —Ar—Y—Ar— where Ar is aromatic, Y is alkylene, haloalkylene, —O—, —S—, —SO$_2$—, —SO$_3$—, —CO—,

or GN<, wherein G is alkyl, haloalkyl, aryl, haloaryl, alkylaryl, haloalkylaryl, arylalkyl, haloarylalkyl, cycloalkyl or cyclohaloalkyl; and n is 0 or 1.

3. The composition of claim 2 wherein said dicarboxylic acid is an aromatic dicarboxylic acid.

4. The composition of claim 3 wherein said aromatic dicarboxylic acid is selected from the group consisting of isophthalic acid, terephthalic acid, and mixtures thereof.

5. The composition of claim 1 wherein said bisphenol has the formula:

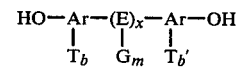

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene, arylene, or haloarylene, —O—, —S—, —SO—, —SO$_2$—, —SO$_3$—, —CO—,

or GN<; T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1.

6. The composition of claim 5 wherein the bisphenol is bisphenol-A.

7. The composition of claim 1 wherein said linear aromatic polyester includes an aliphatic modifier.

8. The composition of claim 7 wherein said aliphatic modifier is a glycol of 2 to 100 carbon atoms.

9. The composition of claim 8 wherein said glycol is selected from the group consisting of neopentyl glycol, diethylene glycol, ethylene glycol, and mixtures thereof.

10. The composition of claim 1 wherein said polyphenylene sulfide has a melt flow index in the range of from about 40 to about 7000.

11. The composition of claim 1 wherein the aromatic polyester is prepared by a melt polymerization technique.

12. The composition of claim 1 which also includes a filler material.

13. The composition of claim 12 wherein said filler material is particulate glass.

14. The composition of claim 1 wherein the filler material is glass fiber present in an amount of about 5 to about 70 weight percent based on the combined weight of the polyester and the phenylene sulfide polymer.